United States Patent
Kodama et al.

(10) Patent No.: US 7,445,572 B2
(45) Date of Patent: Nov. 4, 2008

(54) HYDRAULIC PRESSURE CONTROL APPARATUS AND METHOD FOR CONTINUOUSLY VARIABLE TRANSMISSION

(75) Inventors: Yoshihisa Kodama, Yokohama (JP);
 Midori Yamaguchi, Yokohama (JP);
 Hisao Nobu, Tokyo (JP); Kouhei Wakida, Kanagawa (JP)

(73) Assignee: JATCO Ltd, Shizuoka (JP)

( * ) Notice: Subject to any disclaimer, the term of this patent is extended or adjusted under 35 U.S.C. 154(b) by 590 days.

(21) Appl. No.: 11/243,186

(22) Filed: Oct. 5, 2005

(65) Prior Publication Data

US 2006/0079356 A1  Apr. 13, 2006

(30) Foreign Application Priority Data

Oct. 7, 2004  (JP)  ............................. 2004-294731

(51) Int. Cl.
 *F16H 59/00* (2006.01)
(52) U.S. Cl. ....................................................... 474/28
(58) Field of Classification Search ................... 474/11, 474/18, 28
 See application file for complete search history.

(56) References Cited

U.S. PATENT DOCUMENTS

| | | | |
|---|---|---|---|
| 6,379,278 B1 | 4/2002 | Eguchi et al. | |
| 6,736,753 B2 * | 5/2004 | Endo et al. | 477/3 |
| 6,767,309 B2 * | 7/2004 | Fujimoto et al. | 477/44 |
| 6,916,269 B2 | 7/2005 | Yamamoto et al. | |
| 6,997,831 B2 * | 2/2006 | Kanda et al. | 474/8 |
| 7,371,204 B2 * | 5/2008 | Reuschel et al. | 477/45 |
| 2004/0063523 A1 | 4/2004 | Jozaki et al. | |

FOREIGN PATENT DOCUMENTS

| | | |
|---|---|---|
| JP | 7-224914 A | 8/1995 |
| JP | 8-210449 A | 8/1996 |
| JP | 9-264411 A | 10/1997 |
| JP | 2000-199562 A | 7/2000 |
| JP | 2001-027316 A | 1/2001 |
| JP | 2004-124959 A | 4/2004 |

* cited by examiner

*Primary Examiner*—Dirk Wright
(74) *Attorney, Agent, or Firm*—Foley & Lardner LLP

(57) ABSTRACT

In hydraulic pressure control apparatus and method for a continuously variable transmission, a line pressure of the continuously variable transmission is developed with a working oil supplied from an oil pump as an original pressure, and a command pressure is set to develop a line pressure target value of the target value in such a manner that the command pressure is maintained at a predetermined small value for a constant time and, thereafter, the value of the command pressure is raised up to the target value when a shift range of the continuously variable transmission is switched from a neutral range to a running range, the command pressure being raised at a rate lower than a step input to suppress an overshoot developed in the actual line pressure.

11 Claims, 7 Drawing Sheets

HYDRAULIC PRESSURE CONTROL APPARATUS AND METHOD FOR CONTINUOUSLY VARIABLE TRANSMISSION

BACKGROUND OF THE INVENTION

The present invention relates to hydraulic pressure control apparatus and method for a continuously variable transmission (belt type continuously variable transmission) of an automotive vehicle. The present invention particularly relates to hydraulic pressure control apparatus and method for the continuously variable transmission of the vehicle which appropriately control a hydraulic pressure of a working oil to operate the continuously variable transmission when a shift range of the transmission is switched from a neutral range (N range) to a running range (D range).

A Japanese Patent Application First Publication No. 2004-124959 published on Apr. 22, 2004 exemplifies a previously proposed hydraulic pressure control apparatus for a continuously variable transmission (belt-type continuously variable transmission). In the previously proposed hydraulic pressure control apparatus, in order to suppress an overshoot developed in a line pressure $P_L$, when a time duration for which actual line pressure $P_L$ is equal to or higher than a preset value is continued for a predetermined time, particularly, during an engine cold start time at a low temperature, a controller, determining that line pressure $P_L$ is in a pressure adjusting state, thereafter, sets the command pressure to a maximum value.

SUMMARY OF THE INVENTION

However, in the above-described case, a time at which the command pressure is set to the maximum value is merely delayed. It is difficult to eliminate a problem of an excessive overshooting of the line pressure due to a stepwise rise in the command pressure.

It is, therefore, an object of the present invention to provide hydraulic pressure control apparatus and method for a continuously variable transmission of an automotive vehicle which are capable of suppressing the overshoot developed in the line pressure when the line pressure is raised to operate the continuously variable transmission when a shift range of the continuously variable transmission is switched from the N range to the D range.

According to one aspect of the present invention, there is provided with a hydraulic pressure control apparatus for a continuously variable transmission, comprising: a torque converter; an engine associated with the continuously variable transmission; an oil pump driven by means of the engine; a line pressure control valve configured to develop and control a line pressure of the continuously variable transmission with a working oil supplied from the oil pump as an original pressure; and a line pressure control section configured to command a line pressure command pressure to develop the line pressure at the line pressure control valve to the line pressure control valve, a revolution from the engine being inputted into the continuously variable transmission via the torque converter, the revolution from the engine shifted by the continuously variable transmission being transmitted to driven wheels, the oil pump being arranged to be spaced apart from a principal axis of the transmission, a first sprocket revolved by means of the engine, a second sprocket linked via a chain to the first sprocket, and a revolution axle of the oil pump being coupled together, the revolution of the engine causing the oil pump to be driven, and the line pressure control section controlling the line pressure command pressure in such a manner that a rise rate of the line pressure command pressure is limited to a value smaller than a preset value when a shift range of the continuously variable transmission is transferred from a neutral range to a running range.

According to another aspect of the present invention, there is provided with a hydraulic control apparatus for a continuously variable transmission, comprising: a line pressure control valve configured to develop a line pressure of the continuously variable transmission with a working oil supplied from an oil pump as an original pressure; and a line pressure controlling section configured to set a command pressure to develop a line pressure target value in such a manner that the command pressure is maintained at a predetermined small value for a constant time and, thereafter, the value of the command pressure is raised up to the target value when a shift range is switched from a neutral range to a running range, the line pressure controlling section raising the command pressure (Pc) at a rate lower than a step input to suppress an overshoot developed in the actual line pressure ($P_L$).

According to a still another object of the present invention, there is provided with a hydraulic pressure control method for a continuously variable transmission, comprising: developing a line pressure of the continuously variable transmission with a working oil supplied from an oil pump as an original pressure; and setting a command pressure to develop a line pressure target value of the target value in such a manner that the command pressure is maintained at a predetermined small value for a constant time and, thereafter, the value of the command pressure is raised up to the target value when a shift range of the continuously variable transmission is switched from a neutral range to a running range, the command pressure being raised at a rate lower than a step input to suppress an overshoot developed in the actual line pressure.

This summary of the invention does not necessarily describe all necessary features so that the present invention may also be a sub-combination of these described features.

DETAILED DESCRIPTION OF THE INVENTION

Reference will hereinafter be made to the drawings in order to facilitate a better understanding of the present invention.

Figure 1:
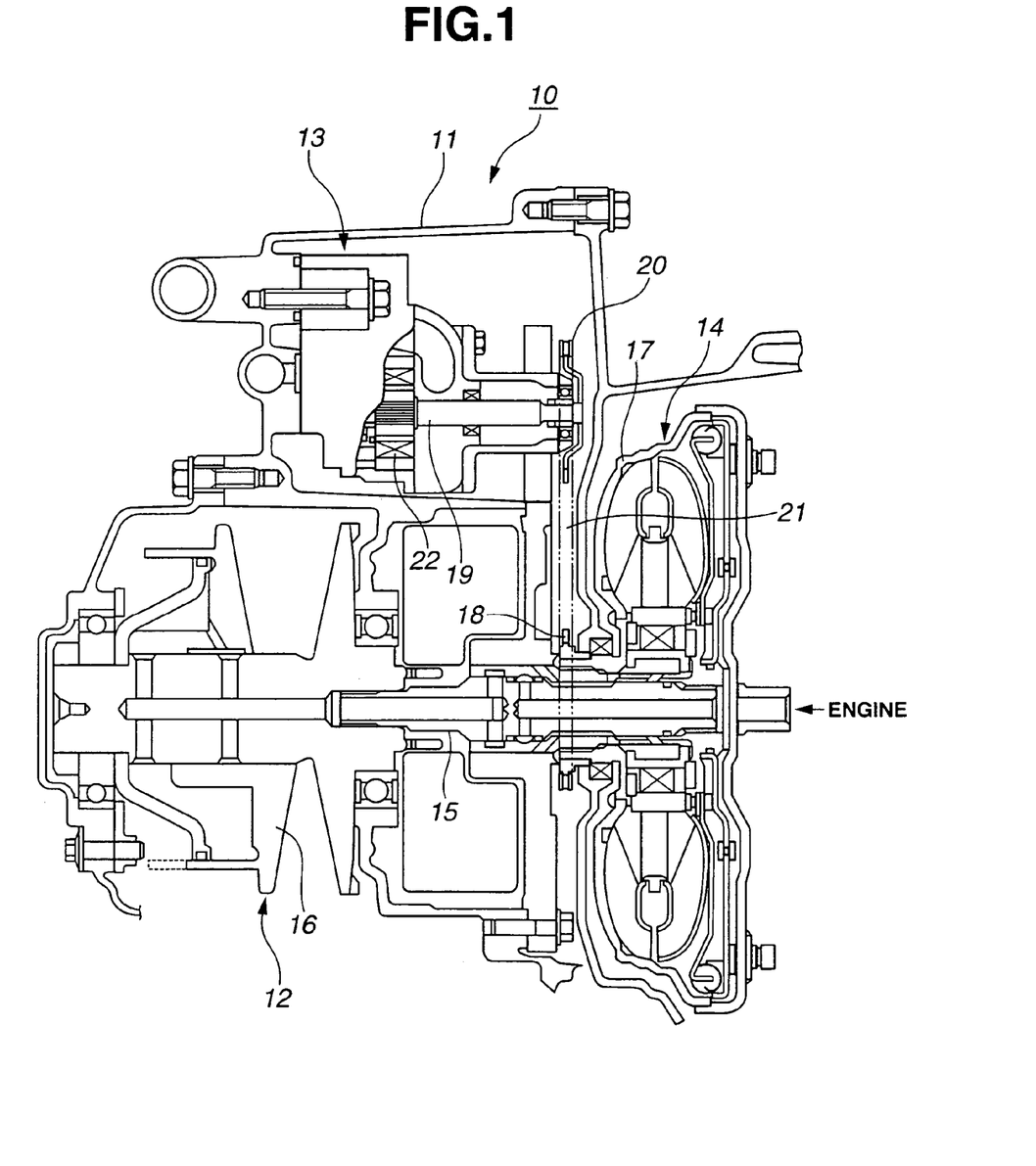
FIG. 1 is a schematic cross sectional view of an example of a belt type continuously variable transmission to which a hydraulic control pressure control apparatus in a preferred embodiment according to the present invention is applicable.

FIG. 1 shows a schematic cross sectional view of a continuously variable transmission to which a hydraulic pressure control apparatus according to the present invention is applicable. Continuously variable transmission 10 shown in FIG. 1 is also called a belt type continuously variable transmission. An oil pump 13 and a shift mechanism 12 are housed within a transmission casing 11. A revolution of an engine is transmitted from an input axle 15 via a torque converter 14 to a primary pulley 16. In this continuously variable transmission 10, a belt is bridged between a primary pulley 16 of shift mechanism 12 and a secondary pulley thereof. Pulley width of each of primary pulley 16 and the secondary pulley is varied so that a radius of the belt of each pulley is varied. Thus, a continuous shift operation is carried out. It is noted that torque converter 14 is provided with a lock-up clutch. The detailed structure of the belt type continuously variable transmission is exemplified by a U.S. Pat. No. 6,916,269 issued on Jul. 12, 2005, the disclosure of which are herein incorporated by reference.

Oil pump 13 serves to supply a working oil to have the pulleys operated to carry out a gear shift through shift mechanism 12 using a hydraulic pressure. In automatic transmission (continuously variable transmission) 10, a sprocket 18 coupled with a converter shell 17 of torque converter 14 is linked with a sprocket 20 attached to one end of a drive axle 19 of an oil pump 13 by means of a chain 21. Hence, the revolution of the engine drivingly revolves a drive axle 19, passes through torque converter 14 via chain 21 to link both of sprockets 18, 20 so that a pump gear 22 is operated and the working oil is supplied thereto.

Figure 2:
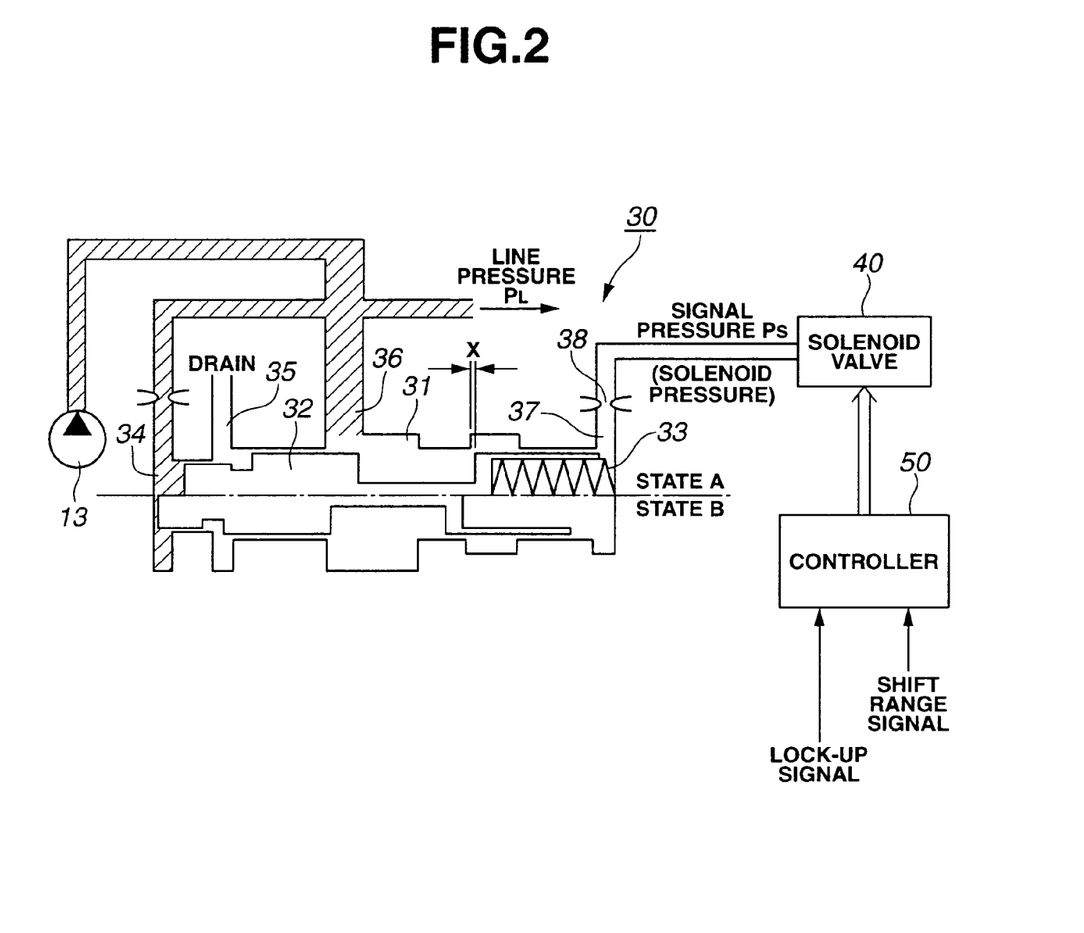
FIG. 2 is a rough schematic drawing representing a pressure regulating valve and its operation used in a transmission shown in FIG. 1.

The working oil supplied from oil pump 13 is set to a predetermined pressure (line pressure $P_L$) to operate shift mechanism 12. A pressure regulator valve 30 (a line pressure control valve) to set (or develop) this pressure is used. FIG. 2 roughly shows pressure regulator valve 30. Pressure regulator valve 30 has a main frame 31 within which a spool 32 and a spring 33 are housed and has four ports 34 through 37. Port 35 is a drain port and port 37 is connected to a solenoid valve 40 via an inlet port 38. This solenoid valve 40 gives a pressure (a signal pressure Ps, or a solenoid pressure) which is varied in accordance with a signal to develop the line pressure by means of pressure regulator valve 30 in response to a signal from a controller 50.

Figure 3A:
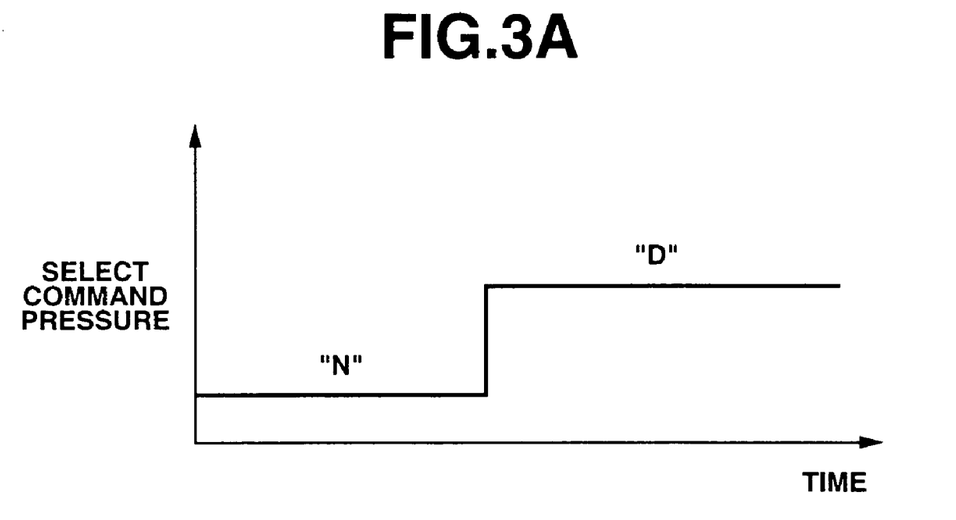
FIGS. 3A and 3B are timing charts representing variations of a select command pressure in FIG. 3A and a line pressure in FIG. 3B.
Figure 3B:
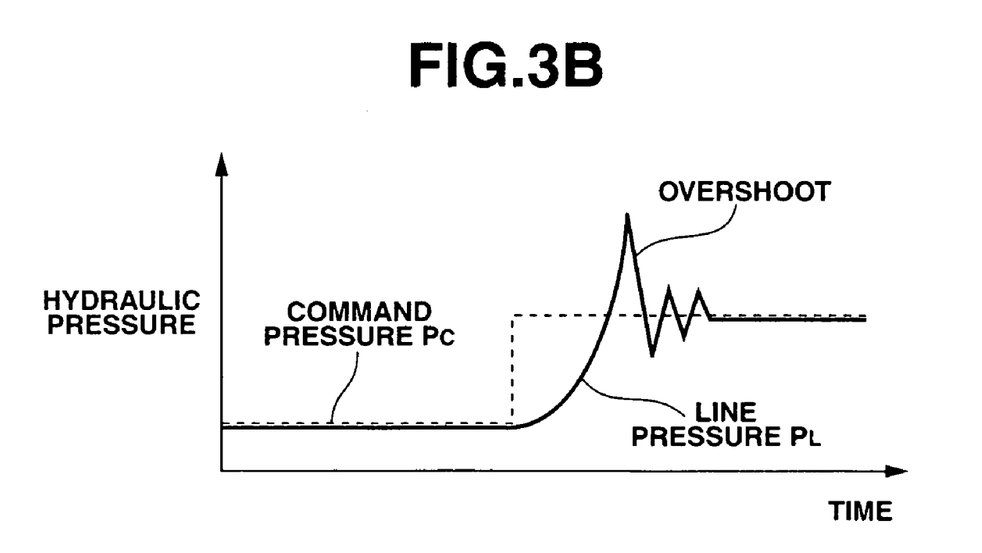

It is noted that, when a transmission shift range is switched from a neutral (N) range to a running (D) range, pressure regulator valve 30 develops line pressure $P_L$ in a process as shown in FIG. 2 and FIGS. 3A and 3B. First, when the shift range of the transmission is switched from the neutral (N) range to the running (D) range, a program incorporated into controller 50 (including a line pressure control section), as shown in FIG. 3A, switches a select command pressure to have shift mechanism 12 operate in accordance with a selected shift range from a value corresponding to the neutral range to a value corresponding to the D range and, at the same time, sets and outputs a command pressure $P_c$ which accords with the signal transmitted to solenoid valve 40 in order to develop line pressure $P_L$ which is a target value. This program is, as shown in a broken line in FIG. 3B, such that, after a certain small value (set pressure) of the hydraulic pressure is maintained for several seconds, a pressure regulating determining control is acted by means of the program and command pressure Pc is raised to the target value in a stepwise manner (a step input).

In accordance with this program, the signal in accordance with above-described command pressure Pc is transmitted from controller 50 to solenoid valve 40 and accordingly signal pressure Ps corresponding to the signal outputted from solenoid valve 40 is added to port 37 of pressure regulator valve 30. Thus, spool 32 is moved from a right side of FIG. 2 to a left side thereof (from a state of A shown in FIG. 2 to a state of B shown in FIG. 2). Accordingly, an opening portion denoted by a sign x becomes narrower. If spool 32 is moved completely to the left side (state B) so that a length of opening portion x gives 0, the stream of flowing out to drain port 35 becomes eliminated. The pressure at port 34 side is increased. Consequently, line pressure $P_L$ is accordingly raised as denoted by a solid line shown in FIG. 3. Thereafter, along with the rise in line pressure $P_L$, the pressure at port 34 is raised so that spool 32 is moved to the right side (state A). However, due to a balance from among command pressure Pc at port 37 side, the pressure at port 34 side (a feedback pressure $P_F$, and is equal to line pressure $P_L$), and spring 33, line pressure $P_L$ is maintained at a predetermined value (target value).

It is noted that, when spool 32 is moved toward the right side to return to state A, a response characteristic of the hydraulic pressure is generally faster than the response characteristic of the hydraulic. Hence, in a process in which the pressure is in a balanced state, an overshoot occurs in actual line pressure $P_L$ due to a response delay in spool 32, as denoted by the solid line in FIG. 3B. In a case where the overshoot developed in line pressure $P_L$ becomes larger as shown in FIG. 3B, an excessive pressure is applied to the pulleys in a case of the automatic transmission, particularly, the continuously variable transmission. In addition, a load is given to chain 21 to drive oil pump 18 shown in FIG. 1 and an expensive chain which can endure this load becomes necessary.

In order to suppress the overshoot developed on the line pressure $P_L$, the previously proposed hydraulic control apparatus disclosed in the Japanese Patent Application First Publication No. 2004-124959 has been proposed. In this Japanese Patent Application First Publication, when, particularly during the engine start at a low temperature, the time duration during which actual line pressure $P_L$ is equal to or higher than the preset value is continued for the predetermined time, line pressure $P_L$ is determined in the pressure regulator state and the command pressure is, thereafter, set to the maximum value. However, in this case, the time at which the command pressure is only set to the maximum value is delayed and it is difficult to eliminate the problem due to the stepwise rise in the command pressure as described above.

FIGS. 4A through 4D show integrally a timing chart for explaining the line pressure command pressure, the actual line pressure, and the torque response variation in a hydraulic pressure control apparatus in a preferred embodiment according to the present invention.

As shown in FIGS. 4A through 4D, when the shift range of automatic transmission (continuously variable transmission 10) is switched from the N range to the D range, the program incorporated into the controller 50 (including the line pressure control section) switches the select command pressure to have the shift mechanism 12 operate in accordance with the shift range from the value corresponding to the N range to the value corresponding to the D range. At the same time, to develop line pressure $P_L$ which gives a target value, command pressure $P_c$ which accords with the signal transmitted to solenoid valve 40 is set and outputted. The above-described program incorporated in controller 50 maintains command pressure Pc at a predetermined small value (set pressure) $P_{Lmin}$ for a constant period of time and, thereafter, raises the value of command pressure Pc to a value $P_{Lmax}$ in which the value of command pressure Pc is the target.

Figure 4A:
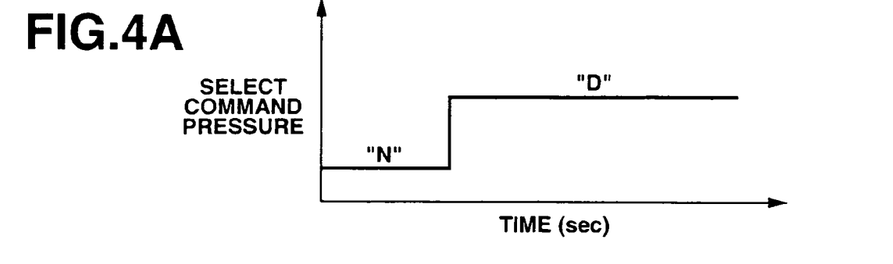
FIGS. 4A, 4B, 4C, 4D are timing charts representing variations in a select command pressure, a line pressure command pressure, an actual line pressure, and a torque response in the hydraulic control apparatus in the preferred embodiment.
Figure 4B:
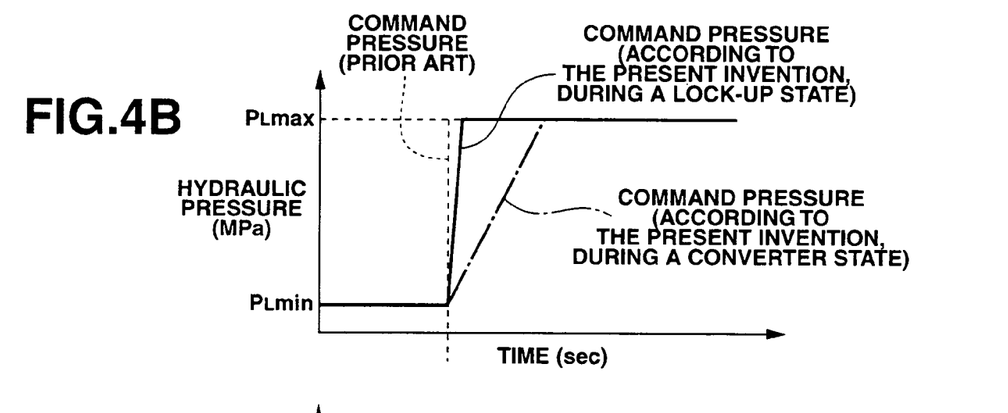

In the case of the present invention, as shown in FIG. 4B, command pressure Pc to develop the line pressure $P_{Lmax}$ which is the target value is not abruptly raised instantaneously vertically as the step input but is raised requiring a certain time (having a gradient smaller than 90°). That is to say, suppose that the rise rate of command pressure Pc (the change of command pressure $P_c$ with respect to time), with the step input as the maximum, command pressure Pc is raised with the limitation placed on command pressure Pc in which the step input is the maximum (the rise rate is suppressed to a lower value than the step input). This is because, as in the conventional case, in the case where the value of command pressure Pc is raised to $P_{LMAX}$ in the stepwise manner (the gradient is 90°), the overshoot which is developed on line pressure $P_L$ becomes large so that the excessive pressure is applied to the pulleys of the continuously variable transmission and the excessive load is applied to the chain to drive the oil pump and, in the present invention, these inconveniences can be prevented.

Figure 4C:
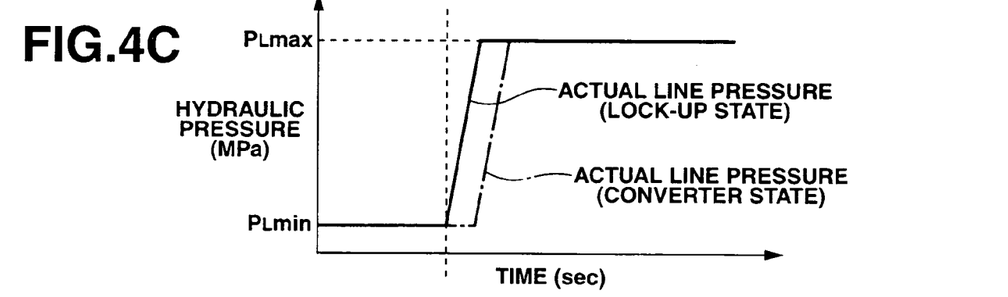

Consequently, an actual line pressure (line pressure) $P_L$ is moderately (slowly) raised as shown in FIG. 4C. As described later, it becomes possible to suppress the overshoot developed in the line pressure to be abruptly raised as in the previously proposed hydraulic pressure control apparatus.

In addition, in the case of the present invention, a rate of rise of command pressure Pc is controlled to become different between a lock-up state in which a lock-up clutch of torque converter 14 is in an engagement state and a converter state in which the lock-up clutch is in a release state.

Figure 4D:
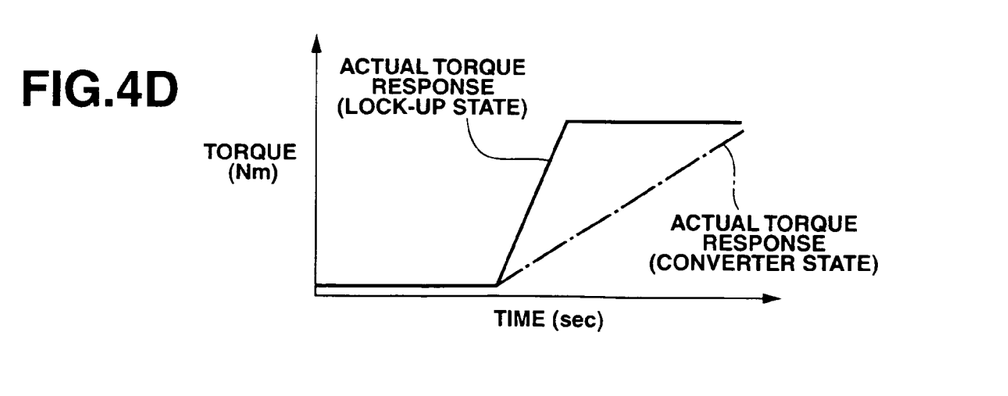

This is because a rise in a torque response is different in the lock-up state and in the converter state, as shown in FIG. 4(D). Especially, in the converter state, the rise in the torque is slower (more moderate) than the lock-up state. In the case of the present invention, with the difference in the rise of the torque response taken into consideration, the rise rate of command pressure Pc is made different from both of the lock-up state and the converter state. In other words, since the rise of the torque response is fast in the lock-up state, the rise rate of command pressure Pc is accordingly enlarged (gradient is steep). On the other hand, in the converter state, since the rise in the torque response is slow, the rate of rise of command pressure Pc is made small (the gradient is made moderate).

If the above-described execution is carried out, the rise in the actual line pressure is different between the lock-up state and the converter state, as described in FIG. 4C. In the converter state, the rise in actual line pressure $P_L$ is developed with a time delay to the case of the lock-up state in response to the moderate rise in command pressure Pc so as to correspond to the rise in the actual torque response.

Figure 5:
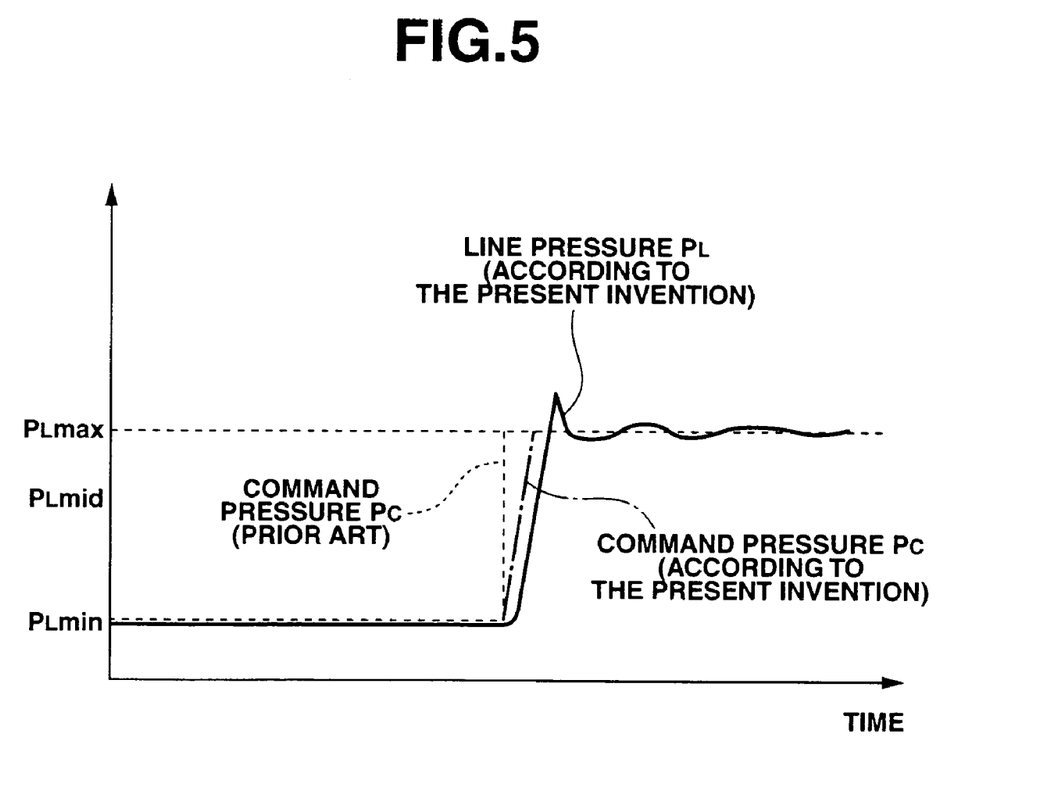
FIG. 5 is a timing chart representing a variation in a line pressure according to the hydraulic pressure control apparatus in the preferred embodiment.

Then, as the hydraulic pressure control as described above is carried out, the overshoot developed on line pressure $P_L$ can be suppressed to be small as shown in FIG. 5. This is caused by a moderate rise of command pressure Pc to generate the line pressure $P_L$ which is the target value without the abrupt increase in instantaneous vertical rise as the conventional step input so that the actual line pressure (actual or real line pressure) $P_L$ is controlled without the abrupt rise in actual line pressure $P_L$.

Figure 6:
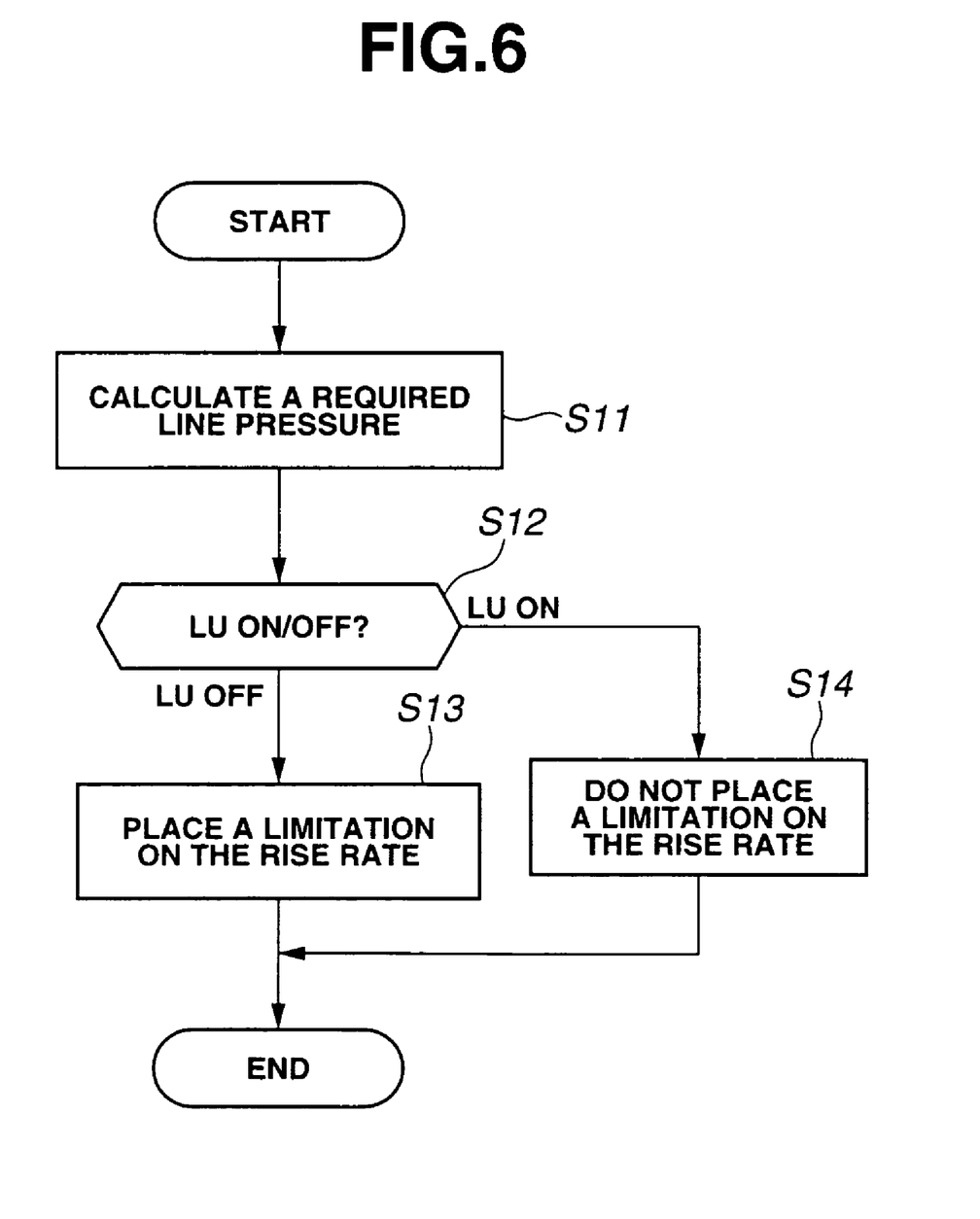
FIG. 6 is a flowchart representing a processing procedure of the hydraulic control apparatus in the preferred embodiment according to the present invention.

FIG. 6 shows a flowchart representing the hydraulic control as described above. Hereinafter, the procedure shown in FIG. 6 will be described below. It is noted that FIG. 6 shows a routine in which the limitation of the rise rate is not carried out when torque converter 14 is in the lock-up state.

Figure 7:
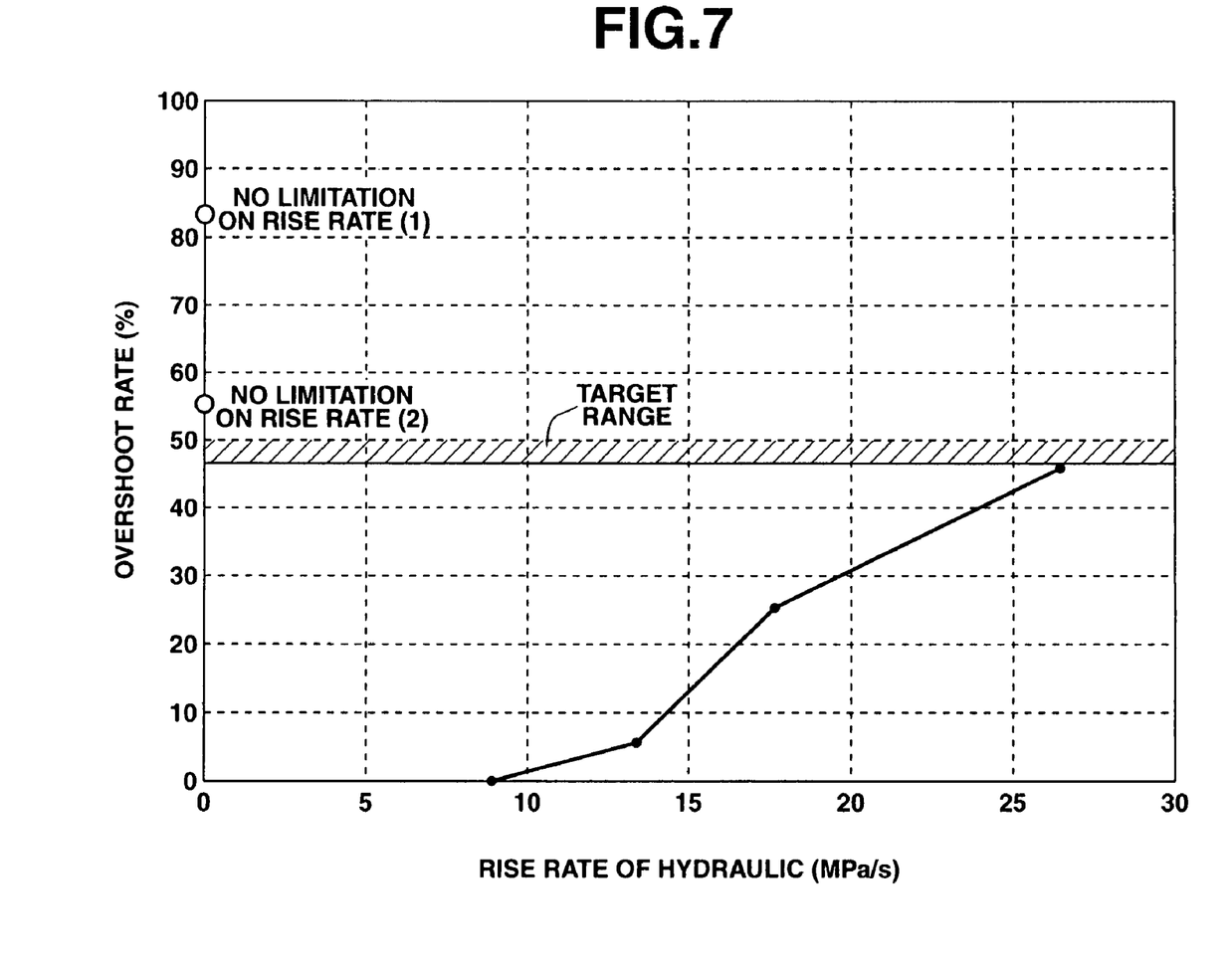
FIG. 7 is a characteristic graph representing a raise rate of the line pressure command pressure and the magnitude of the overshoot in the hydraulic pressure control apparatus according to the present invention.

At a step S11, hydraulic pressure controller 50 derives a required line pressure, namely, the target line pressure ($P_{Lmax}$ in FIGS. 4B, 4C, and 5). At the next step S12, hydraulic pressure controller 50 determines whether the torque converter is in the lock-up state according to a lock-up signal. If the torque converter is not in the lock-up state (L/U off), namely, the torque converter is in the converter state, the hydraulic control to limit the rise rate of command pressure Pc is carried out. On the other hand, if the torque converter is in the lock-up state (LU on), the routine goes to a step S14 in which the hydraulic control not limiting the rise rate of command pressure Pc is carried out. FIG. 7 is a graph representing the rise rate of the hydraulic pressure (line pressure command pressure Pc) and a magnitude of the overshoot developed on the actual line pressure. The overshoot rate in the longitudinal axis of FIG. 7 represents a ratio between a value of actual line pressure $P_{Lmax}$ and a value of actual line pressure $P_{Lmax}$ subtracted from the peak value of the overshoot, namely, a ratio between the actual line pressure $P_{Lmax}$ and a value indicating how depth the overshoot is carried out from actual line pressure $P_{Lmax}$. For example, the overshoot rate is 50% means that a height of the overshoot from actual line pressure $P_{Lmax}$ is half $P_{Lmax}$.

In FIG. 7, no limitation of rise rate (1) and (2) indicates that the rise rate of line pressure command pressure Pc using the control according to the present invention is not limited. That is to say, no limitation of rise rate (1) and (2) denotes the overshoot rate in the case of the conventional step input. Especially, (1) indicates a high value considerably higher than 80% overshoot rate. In this case, the pressure corresponding to the peak of the overshoot gives the excessive load to the chain driving the engine.

In FIG. 7, the target value of the overshoot rate is set to 46% to 50% and the overshoot rates with respect to the rise rates of the plurality of different line pressure command pressures Pc are plotted. As shown in FIG. 7, if the rise rates of line pressure command pressure Pc is set to about 26% to 27%, it will be appreciated that this rise rate can arrive at a target value of the overshoot rate.

It is of course that it is desirable for this overshoot rate to be as low as possible. As shown in the drawings, if the overshoot rate is tried to be reduced as shown in FIG. 7, it is necessary to more reduce the rise rate of line pressure command pressure Pc, namely, the rise in the line pressure command pressure Pc is needed to be more moderated. Consequently, such an ill effect on the rise of actual line pressure $P_L$ becomes moderate than necessary and the rise becomes delayed.

To prevent this, it is necessary to set the rise rate of the line pressure command pressure Pc so as to obtain the rise in an optimum actual line pressure $P_L$ while allowing the overshoot to some degree. It is of course that a peak of the overshoot is set to a value of the level at which the excessive load is applied to the chain driving the pulley of the continuously variable transmission and the oil pump.

As described hereinabove, the hydraulic control apparatus for the continuously variable transmission suppresses the overshoot developed when the line pressure is raised to the maximum value when the shift range is switched from the N (neutral) range to the D (running) range. It becomes possible to effectively prevent the application of the excessive pressure on the shift mechanism, particularly, the pulleys of the continuously variable transmission due to the development of the overshoot and the application of the excessive load on the chain to drive the oil pump.

This application is based on a prior Japanese Patent Application No. 2004-294731 filed in Japan on Oct. 7, 2004, the disclosure of which is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A hydraulic pressure control apparatus for a continuously variable transmission, comprising:
a torque converter;
an engine associated with the continuously variable transmission;
an oil pump driven by means of the engine;
a line pressure control valve configured to develop and control a line pressure of the continuously variable transmission with a working oil supplied from the oil pump as an original pressure; and
a line pressure control section configured to command a line pressure command pressure to develop the line pressure at the line pressure control valve to the line pressure control valve, a revolution from the engine being inputted into the continuously variable transmission via the torque converter, the revolution from the engine shifted by the continuously variable transmission being transmitted to driven wheels, the oil pump being arranged to be spaced apart from a principal axis of the transmission, a first sprocket revolved by means of the engine, a second sprocket linked via a chain to the first sprocket, and a revolution axle of the oil pump being coupled together, the revolution of the engine causing the oil pump to be driven, and the line pressure control section controlling the line pressure command pressure in such a manner that a rise rate of the line pressure command pressure is limited to a value smaller than a preset value when a shift range of the continuously variable transmission is transferred from a neutral range to a running range.

2. A hydraulic pressure control apparatus for a continuously variable transmission as claimed in claim 1, wherein the torque converter is provided with a lock-up clutch and wherein the line pressure control section controls and switches the rise rate of the line pressure command pressure depending upon whether the lock-up clutch of the torque converter is engaged in a lock-up clutch state or released in a converter state.

3. A hydraulic pressure control apparatus for a continuously variable transmission as claimed in claim 2, wherein the rise rate of the line pressure command pressure in the lock-up state of the torque converter is larger than that in the converter state of the torque converter.

4. A hydraulic pressure control apparatus for a continuously variable transmission as claimed in claim 2, wherein, when the lock-up clutch of the torque converter is engaged in the lock-up state, the line pressure controlling section does not limit the rise rate of the line pressure command pressure and, when the lock-up clutch of the torque converter is released in the converter state, the line pressure controlling section limits the rise rate of the line pressure command pressure.

5. A hydraulic pressure control apparatus for a continuously variable transmission as claimed in claim 4, wherein the line pressure controlling section comprises a target line pressure deriving section that derives a target line pressure; a lock-up state determining section that determines whether the torque converter is in a lock-up state in which the lock-up clutch of the torque converter is engaged in the lock-up state; and a rise rate limitation placing section that places no limitation on the rise rate of the line pressure command pressure when the lock-up clutch of the torque converter is engaged in the lock-up state and that places a limitation on the rise rate of the line pressure command pressure when the lock-up state determining section determines that the lock-up clutch of the torque converter is released in the converter state.

6. A hydraulic control apparatus for a continuously variable transmission, comprising:
a line pressure control valve configured to develop a line pressure of the continuously variable transmission with a working oil supplied from an oil pump as an original pressure; and
a line pressure controlling section configured to set a command pressure to develop a line pressure target value in such a manner that the command pressure is maintained at a predetermined small value for a constant time and, thereafter, the value of the command pressure is raised up to the target value when a shift range is switched from a neutral range to a running range, the line pressure controlling section raising the command pressure at a rate lower than a step input to suppress an overshoot developed in the actual line pressure.

7. A hydraulic pressure control apparatus for a continuously variable transmission as claimed in claim 6, wherein a rise rate of the command pressure is controlled to be different depending upon cases where a lock-up clutch of a torque converter is engaged in a lock-up state and where the lock-up clutch of the torque converter is released in a converter state.

8. A hydraulic pressure control apparatus for a continuously variable transmission as claimed in claim 7, wherein the rise rate of the command pressure when the lock-up clutch of the torque converter is engaged in the lock-up state is larger than the rise rate of the command pressure when the lock-up clutch of the torque converter is released in the converter state.

9. A hydraulic pressure control apparatus for a continuously variable transmission as claimed in claim 6, wherein the line pressure controlling section switches a select command pressure to have a shift mechanism operate in accordance with the selected shift range from a value corresponding to the neutral range to a value corresponding to the running range.

10. A hydraulic pressure control apparatus for a continuously variable transmission as claimed in claim 6, wherein the line pressure controlling valve comprises a pressure regulator valve and the line pressure controlling section comprises a solenoid valve, the pressure regulator valve receiving a signal pressure from the solenoid valve in accordance with the line pressure command pressure.

11. A hydraulic pressure control method for a continuously variable transmission, comprising: developing a line pressure of the continuously variable transmission with a working oil supplied from an oil pump as an original pressure; and setting a command pressure to develop a line pressure target value of the target value in such a manner that the command pressure is maintained at a predetermined small value for a constant time and, thereafter, the value of the command pressure is raised up to the target value when a shift range of the continuously variable transmission is switched from a neutral range to a running range, the command pressure being raised at a rate lower than a step input to suppress an overshoot developed in the actual line pressure.

* * * * *